United States Patent [19]

Shimazaki et al.

[11] Patent Number: 4,555,113

[45] Date of Patent: Nov. 26, 1985

[54] SHAFT AND A METHOD FOR PRODUCING THE SAME

[75] Inventors: Fumio Shimazaki, Tokyo; Koji Asai; Jiro Ohno, both of Saitama, all of Japan

[73] Assignee: Komei Shibata, Columbus, Miss.

[21] Appl. No.: 512,653

[22] Filed: Jul. 11, 1983

[30] Foreign Application Priority Data

Apr. 6, 1983 [JP] Japan .......................... 58-50258
Apr. 6, 1983 [JP] Japan .......................... 58-50259

[51] Int. Cl.⁴ ............................................. A63B 53/10
[52] U.S. Cl. ........................ 273/80 B; 273/DIG. 23; 156/172; 156/175; 156/188; 156/195; 428/35; 428/366; 428/367; 428/377; 428/902
[58] Field of Search ............... 428/366, 367, 902, 377, 428/35; 156/188, 195, 172, 175; 273/80 B, 81.5, 81.6

[56] References Cited

U.S. PATENT DOCUMENTS

| | | | |
|---|---|---|---|
| 3,574,104 | 4/1971 | Medler | 428/377 |
| 3,969,557 | 1/1976 | Jenks | 428/377 |
| 4,135,035 | 1/1979 | Branen et al. | 428/367 |
| 4,189,985 | 2/1980 | Harris | 156/172 |
| 4,415,613 | 11/1983 | Medney | 156/172 |

Primary Examiner—George F. Lesmes
Assistant Examiner—P. R. Schwartz
Attorney, Agent, or Firm—Koda and Androlia

[57] ABSTRACT

A shaft produced by the steps of rolling inorganic fiber cloths around a plastic resin base body into a cylindrical shape to form a shaft body, coiling two sets of carbon cloth tapes in the opposite directions around the shaft body, and impregnating resin into the shaft body and carbon cloth tapes to integrate them into a single body. The shaft obtained by the method is light and strong and shows excellent resiliency. The shaft is particularly advantageous and reliable for golf clubs, fishing poles, and the like.

5 Claims, 4 Drawing Figures

SHAFT AND A METHOD FOR PRODUCING THE SAME

BACKGROUND OF THE INVENTION

1. Field of the Invention

The present invention relates to a method of producing a shaft and particularly to a shaft for a golf club, fishing pole, etc. that is superior in strength as well as in resilience.

2. Prior Art

The conventionally manufactured shafts for golf clubs, fishing poles, etc. include those made of high strength carbon fibers, in addition to those made of metal. However, such carbon fiber shafts have been disadvantageous in that they are inferior to the metal shafts in strength and resilience.

It has also been known that two carbon cloth tapes may be wound around a shaft in the opposite direction so that the two tapes come across each other to form a uniform pattern with crossing portions. Such crossing portions are formed every 180 degrees around the shaft (FIG. 1). This will improve the strength of the shaft with those crossing portions. However, since those crossing portions are located only every 180 degrees, the strength and the resiliency of the shaft are uneven. Particularly, the shaft shows weakness when tension is applied in the direction where there are no crossing portions.

Taking golf clubs, for example, golf clubs are divided into two types. One is usually called "wood clubs"; and the other is called "iron clubs". A golf club set is comprised of three or four wood clubs and seven to nine iron clubs in addition to a putter.

As shown in FIG. 2, a golf club has a head b at the end of a shaft a. For each of the clubs, the length and the weight are preliminary specified. To obtain a strong shot, it is desirable to make the club head heavier while making the club shaft lighter for offsetting the weight increase in the head. However, it is difficult to make the shaft light while maintaining the strength and the resiliency of the shaft.

SUMMARY OF THE INVENTION

Accordingly, the primary object of this invention is to obviate the disadvantages of the shafts made in accordance with the prior art, and to provide a shaft for a golf club, fishing pole, etc. that is made light by using carbon fibers.

Another object of the present invention is to provide a shaft wherein further improvements are incorporated to make it lighter than the conventional shaft made of carbon fibers and also to make it as strong as that made of metal.

Another object of the present invention is to provide a shaft that is easy to be manufactured.

DETAILED DESCRIPTION OF THE INVENTION

Figure 2:
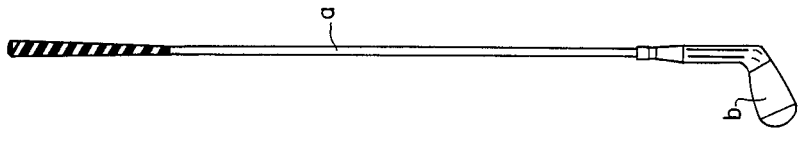
FIG. 2 is a plan view of a golf club.
Figure 1:
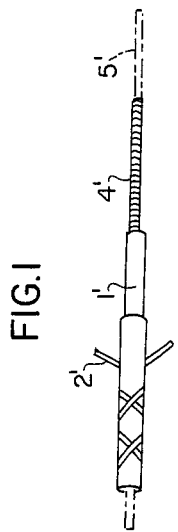
FIG. 1 is a plan view of a prior art shaft.
Figure 3:
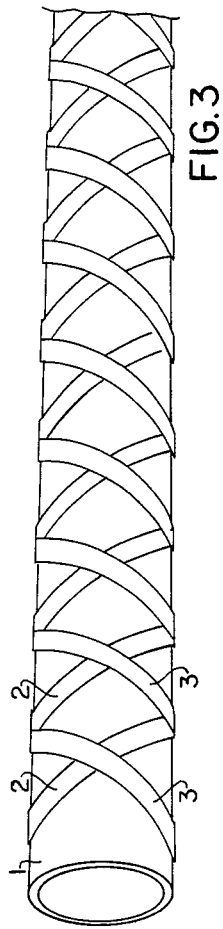
FIG. 3 is a perspective view of an embodiment of a shaft according to the present invention.
Figure 4A:
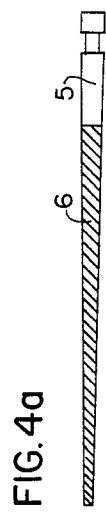
FIG. 4 is a diagram showing the manufacturing steps.
Figure 4B:
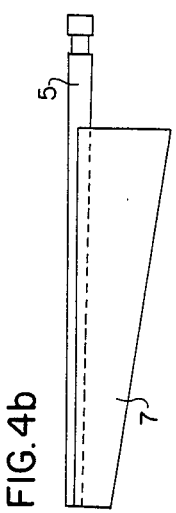
Figure 4C:
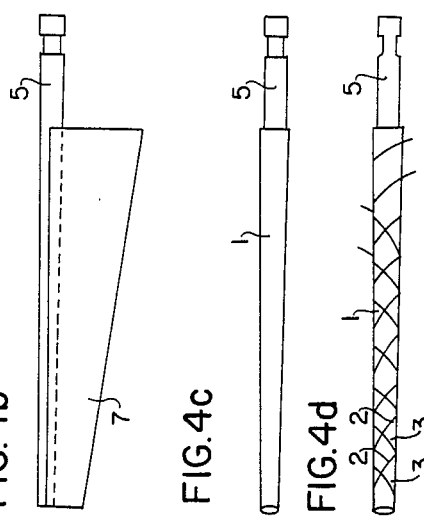
Figure 4D:
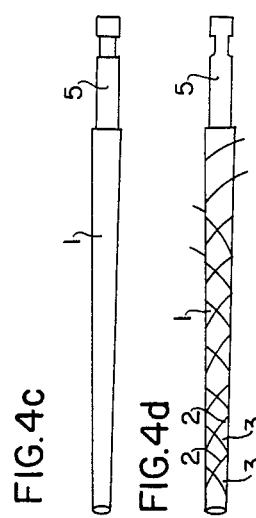
Figure 4E:
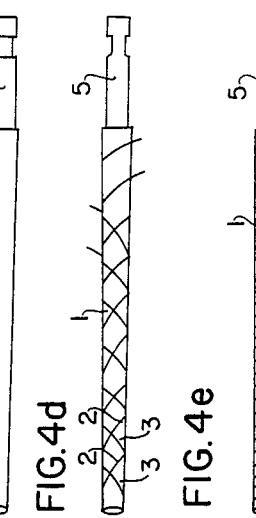
Figure 4F:
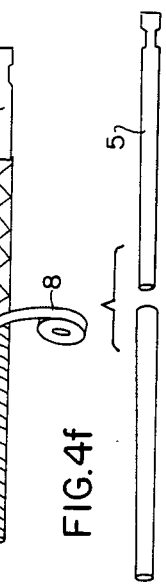

Referring to FIGS. 3 and 4, a shaft according to the present invention has the following structure. A shaft body 1 is prepared by rolling an inorganic fiber sheet made of fiberglass carbon cloth, boron fiber cloth, or a combination thereof into a multi-layered cylindrical body which is adhered to a plastic resin layer 6 (FIG. 4(A)). Two sets of tapes made of carbon cloth or fiber glass 2 and 3 are placed side by side with a predetermined space therebetween, and they are wound over the outer circumferential surface of the shaft body 1 for its whole length. Each set has at least two tapes. The winding of the two sets of the carbon cloth (or fiberglass) tape 2 and 3 is performed by coiling them into spiral form with gentle pitch by keeping them in parallel to each other with the preset space left between them. It is arranged such that the coiling directions of these two sets are opposite so that these two sets meet and cross each other at least every 90 degree angle. Thereafter, the whole assembly thus obtained is impregnated with epoxy resin, etc.

As described above, the shaft according to the present invention is provided with two sets of the tapes 2 and 3. Each set of the tapes 2 and 3 are wound around the outer circumference of the shaft body 1 in spiral form. The coiling directions of the two sets of the tapes 2 and 3 are mutually opposite. Therefore, on the outer circumference of the shaft body 1, a large number of crossing portions are formed along the longitudinal direction at the points. For example, if each set has two tapes as shown in FIG. 3, the two sets of tapes 2 and 3 form crossing portions at every 90 degree angle. These crossing portions of tapes improve the strength of the shaft.

The known art only teaches two tapes coming across forming crossing portions every 180 degrees. This would result in uneven strength depending on which direction the shaft receives tension.

When the bending force is applied to the shaft of this invention, regardless of the direction of the force, the crossing portions of these tapes 2 and 3 function as resisters, thereby contributing to the generation of the restoring force. This in turn brings about the desirable effects during the shot. That is, the stress caused by the quickly occurred twist can be absorbed, and also the residual stress is prevented from remaining. Accordingly, the shaft shows even resistance against stress regardless of the direction.

Hereunder, the steps for manufacturing the shaft according to the present invention will be described with reference to FIG. 4.

(1) After coating wax over the circumferential surface of a mandrel 5, resin is coated to form a resin layer 6. (FIG. 4(A)).

(2) A piece of carbon (or boron fiber) sheet 7 is rolled over the abovementioned resin layer 6 to wrap it. Then, the carbon (or boron fiber) sheet 7 is tentatively bonded to the resin layer 6 through ironing. (FIG. 4(B)).

(3) The base body is pressed by rolling to be formed into an integrated single shaft body. (FIG. 4(C)).

(4) A first set of tapes 2 made of carbon cloth with a width of 3-5 mm are wound to the shaft body 1 from one end toward the other end with a preset space therebetween. A second set of tapes 3 made of the same material as the first set are also wound in the same manner but to the opposite direction as shown in FIG. 3 such that the first and second sets 2 and 3 come across each other forming crossing portions every 90 degrees of angle around the shaft body (see also FIG. 4(D)).

(5) The external surface of the aforesaid shaft body 1 is covered with a cellophane tape 8 tightly. Thereafter, the shaft body 1 is treated in a heating furnace and cured. (FIG. 4(E)).

(6) The shaft body 1 is pulled out of the mandrel 5, and the cellophane tape 8 is rubbed off with metal buff. Then, the shaft body 1 is polished with cotton buff and finished with clear coating into a shaft. (FIG. 4(F)).

It should be apparent to those skilled in the art that the resin utilized in the resin layer 6 could be any resin such as epoxy or polyester resin.

As should be apparent from the foregoing description, the shaft in accordance with the present invention is extremely strong against external forces. In addition, because it is a thin cylindrical body, made of light material, it can be made remarkably light in weight. This allows the shafts to be very efficient when used in golf clubs, fishing poles, etc.

We claim:

1. A shaft consisting of:
a shaft body consisting of inorganic fiber cloth and plastic resin; and
two sets of tapes made of carbon cloth and spirally wound around said shaft body for its entire length, said two sets of tapes being in opposite directions from each other, and each one of said sets of tapes including at least two tapes wound in parallel, whereby said sets of tapes comes across on said shaft body to form crossing portions at least every 90 degrees of rotation about said shaft body.

2. A shaft according to claim 1, wherein said sets of tapes comprise two tapes respectively.

3. A golf club including the shaft of claim 2.

4. A shaft according to claim 1, wherein each of said sets of tapes comprises three tapes whereby said sets of tapes come across on said shaft body to form crossing portions at least every 60 degrees of rotation about said shaft body.

5. A shaft according to claim 1, wherein each of said sets of tapes comprises four tapes whereby said sets of tapes come across on said shaft body to form crossing portions at least every 45 degrees of rotation about said shaft body.

* * * * *